(No Model.)

A. WECKMILLER.
COFFIN.

No. 400,023. Patented Mar. 19, 1889.

WITNESSES,

Adolph Weckmiller INVENTOR.

By Leggett & Leggett
ATTORNEY.

UNITED STATES PATENT OFFICE.

ADOLPH WECKMILLER, OF CLEVELAND, OHIO, ASSIGNOR TO THE CLEVELAND BURIAL CASE COMPANY, OF SAME PLACE.

COFFIN.

SPECIFICATION forming part of Letters Patent No. 400,023, dated March 19, 1889.

Application filed November 26, 1888. Serial No. 291,874. (No model.)

*To all whom it may concern:*

Be it known that I, ADOLPH WECKMILLER, of Cleveland, in the county of Cuyahoga and State of Ohio, have invented certain new and useful Improvements in Burial-Caskets; and I do hereby declare the following to be a full, clear, and exact description of the invention, such as will enable others skilled in the art to which it pertains to make and use the same.

My invention relates to improvements in burial-caskets, in which a molding, other than the ordinary molding struck on the cover, is planted on the edge of the cover, and preferably covered with different fabrics from that applied to the cover and body of the casket, to the end that such molding by contrast adds beauty to the casket and in handling the cover prevents the cloth covering of the latter from being roughed. A molding is planted on the body of the casket next above, and apparently forming a continuation of the base-molding, such additional molding being preferably covered with other fabric than the body of the casket, and preferably covered with the same fabric as the aforesaid molding of the cover, the moldings being preferably of the same general design.

Figure 1:
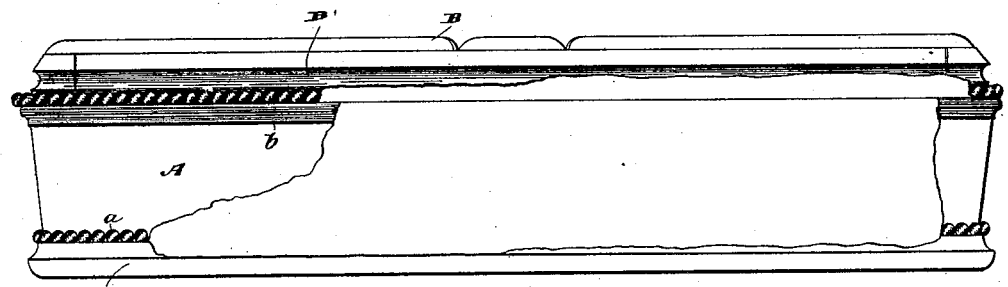
Figure 2:
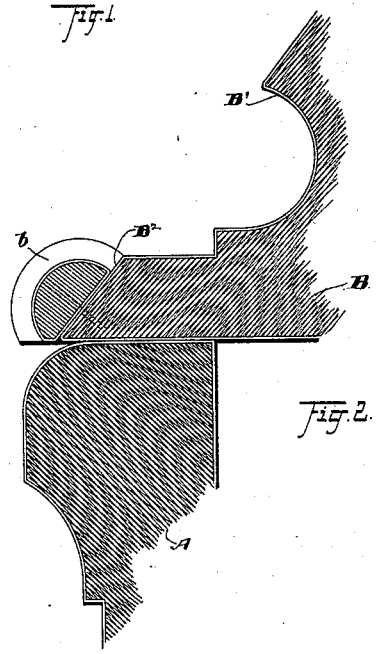
Figure 3:
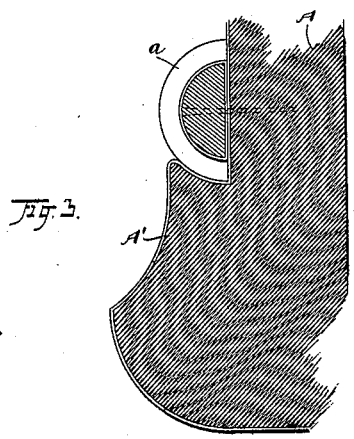

In the accompanying drawings, Figure 1 is a side elevation, partly in section. Figs. 2 and 3 are enlarged details in section.

A represents the body of the casket, and B the cover. The edges of the cover have usually sloping sides with a broad molding struck thereon, as shown at B', and heretofore such molding formed the extreme edge of the lid, and in handling the lid the nap of the cloth covering was usually "roughed up," so as to present a rough uneven surface that detracted from the appearance of the casket. With my improved construction the molding B terminates in a flat surface, $B^2$, at the edge thereof for receiving, and on which flat surface is planted the separate molding $b$. The cover is first covered with fabric, usually broadcloth, after which molding $b$ is attached, this preferably having previously been covered with satin, or such other fabric as will bear handling without roughing the surface thereof. The molding $b$ is preferably of the ball variety shown—that is, having a series of balls turned on the wood and connecting the one ball with another, or of the spiral or rope variety, these two varieties of molding, the ball and the rope, when covered and in place on the casket, giving about the same general effect, and either materially increasing the beauty of the casket.

The body of the casket, as heretofore, is provided with the base-molding A', and next above such base-molding, and apparently forming a continuation or finish of the base-molding, I apply the molding $a$, the latter preferably corresponding with molding $b$ in variety and in covering. Above molding $a$, and from thence to the cover, is preferably left a plane flat surface, as shown.

Heretofore between the base-molding and the cover of the casket moldings of various kinds have been applied to form panel-work; but such moldings and panel-work presented an entirely different appearance from that had with molding $a$, arranged as shown.

What I claim is—

1. In burial-caskets, the combination, with the casket-cover having the usual molding struck along the edges thereof, of a separate molding planted on the edge of such cover, such different moldings being preferably covered with other material than that applied to the casket generally, substantially as set forth.

2. The combination, with the body of a burial-casket, having a base-molding of a different molding planted on the casket next above and apparently forming a continuation of such base-molding, such different molding being preferably covered with different material from that applied to the casket generally, substantially as set forth.

In testimony whereof I sign this specification, in the presence of two witnesses, this 10th day of October, 1888.

ADOLPH WECKMILLER.

Witnesses:
   CHAS. H. DORER,
   ALBERT E. LYNCH.